United States Patent
Schelstraete et al.

(10) Patent No.: US 12,119,939 B2
(45) Date of Patent: *Oct. 15, 2024

(54) FEEDBACK AND RETRANSMISSION FORMAT OF HARQ PROTOCOL

(71) Applicant: MAXLINEAR, INC., Carlsbad, CA (US)

(72) Inventors: Sigurd Schelstraete, Menlo Park, CA (US); Imran Latif, Fremont, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,552

(22) Filed: May 23, 2023

(65) Prior Publication Data

US 2023/0299889 A1    Sep. 21, 2023

Related U.S. Application Data

(63) Continuation of application No. 17/022,366, filed on Sep. 16, 2020, now Pat. No. 11,658,776.

(Continued)

(51) Int. Cl.
*H04L 1/1812* (2023.01)
*H04B 7/06* (2006.01)
(Continued)

(52) U.S. Cl.
CPC ......... *H04L 1/1819* (2013.01); *H04B 7/0632* (2013.01); *H04L 1/0006* (2013.01);
(Continued)

(58) Field of Classification Search
CPC ....... H04L 1/0006; H04L 1/08; H04L 1/1614; H04L 1/1819; H04L 1/1858; H04L 1/1861; H04L 1/1864; H04B 7/0632
See application file for complete search history.

(56) References Cited

U.S. PATENT DOCUMENTS 6,269,080 B1  7/2001  Kumar
8,942,208 B2  1/2015  Luo et al.
(Continued)

FOREIGN PATENT DOCUMENTS

CN     101615979 A     12/2009
CN     108900284 A     11/2018
(Continued)

OTHER PUBLICATIONS

European Search Report for counterpart EP Application No. 19207943, mailed Mar. 10, 2020, 3 pages.

(Continued)

*Primary Examiner* — Gary Mui
(74) *Attorney, Agent, or Firm* — Buchalter; Jason W. Croft

(57) ABSTRACT

A method includes sending wireless data to a receiver node and receiving feedback from the receiver node that identifies a subset of the wireless data that the receiver node failed to receive correctly and that includes a token value as a label for the subset of the wireless data as a group. The method includes constructing retransmission wireless data that includes the subset of the wireless data and the token value. The method includes sending the retransmission wireless data to the receiver node. The receiver node may be a first client device. The method further includes allocating a first set of token values to the first client device and a second set of non-overlapping token values to a second client device in a network. The method includes respectively notifying the first and second client device of the corresponding set of token values for retransmissions requested by the corresponding client device.

22 Claims, 7 Drawing Sheets

Related U.S. Application Data

(60) Provisional application No. 62/932,937, filed on Nov. 8, 2019.

(51) Int. Cl.
*H04L 1/00* (2006.01)
*H04L 1/08* (2006.01)
*H04L 1/1607* (2023.01)
*H04L 1/1829* (2023.01)

(52) U.S. Cl.
CPC .............. *H04L 1/08* (2013.01); *H04L 1/1614* (2013.01); *H04L 1/1858* (2013.01)

(56) References Cited

U.S. PATENT DOCUMENTS

| | | |
|---|---|---|
| 10,270,579 B2 | 4/2019 | Chendamarai Kannan et al. |
| 10,433,329 B2 | 10/2019 | Guan et al. |
| 10,727,988 B2 | 7/2020 | Bergström et al. |
| 11,658,776 B2 | 5/2023 | Schelstraete et al. |
| 2002/0150040 A1* | 10/2002 | Tong ............... H04L 1/1809 370/216 |
| 2009/0067551 A1 | 3/2009 | Chen et al. |
| 2010/0098006 A1 | 4/2010 | Golitschek Edler Von Elbwart et al. |
| 2010/0115358 A1 | 5/2010 | Kotecha et al. |
| 2010/0146358 A1 | 6/2010 | Kazmi et al. |
| 2011/0041027 A1 | 2/2011 | Fong et al. |
| 2014/0092824 A1 | 4/2014 | He et al. |
| 2014/0104999 A1 | 4/2014 | Kim et al. |
| 2016/0192388 A1 | 6/2016 | Ekpenyong et al. |
| 2017/0230149 A1 | 8/2017 | Wang et al. |
| 2018/0006791 A1 | 1/2018 | Marinier et al. |
| 2018/0234226 A1 | 8/2018 | Hosseini |
| 2018/0234880 A1 | 8/2018 | Jiang et al. |
| 2018/0262316 A1 | 9/2018 | Wang et al. |
| 2018/0270022 A1 | 9/2018 | Sun et al. |
| 2018/0270799 A1 | 9/2018 | Noh et al. |
| 2018/0359745 A1 | 12/2018 | Yeo et al. |
| 2019/0020444 A1* | 1/2019 | Fröberg Olsson .... H04L 1/1819 |
| 2019/0097762 A1 | 3/2019 | Jeon et al. |
| 2019/0165894 A1 | 5/2019 | Choi et al. |
| 2019/0356423 A1 | 11/2019 | Lee et al. |
| 2020/0153547 A1 | 5/2020 | Latif et al. |
| 2020/0235867 A1 | 7/2020 | Choi et al. |
| 2020/0274601 A1 | 8/2020 | Ku et al. |
| 2020/0359387 A1 | 11/2020 | Su |
| 2021/0105693 A1 | 4/2021 | Tripathi et al. |
| 2021/0126743 A1 | 4/2021 | Shabdanov et al. |
| 2021/0219300 A1 | 7/2021 | Lou et al. |

FOREIGN PATENT DOCUMENTS

| | | |
|---|---|---|
| CN | 109446751 A | 3/2019 |
| WO | 2017182053 A1 | 10/2017 |

OTHER PUBLICATIONS

Sequans: "CBG A/N multiplexing for CA and cross-slot scheduling". 3GPP Draft; RI-1718708—CBG Based HARQ, 3rd Generation Partnership Project (3GPP), Mobile Competence Centre; 650, Route Des Lucioles; F-06921 Sophia-Antipolis Cedex; France, vol. RAN WGI, No. Prague, CZ; Oct. 9, 2017-Oct. 13, 2017 Oct. 8, 2017, XP051341881, Retrieved from the Internet: URL:http://www.3gpp.org/ftp/Meetings -3GPP - SYNC/RANI/Docs/ [retrieved on Oct. 8, 2017], pp. 1-3.

Interdigital Inc: "On the remaining details of CBG based (re)transmission", 3GPP Draft; RI-1720555 (R15 NR WI AI 7333 CBG Based Retransmission), 3rd Generation Partnership Project {3GPP), Mobile Competence Centre; 650, Route Des Lucioles; F-06921 Sophia-Antipolis Cedex; France, vol. RAN WGI, No. Reno, USA; Nov. 2017, XP051369249, Retrieved from the Internet: URL:http://www.3gpp.org/ftp/tsg%5Fran/WG1% 5FRL1/TSGR1%5F91/ Docs/ [retrieved on Nov. 17, 2017], p. 2.

Huawei et al: Summary of remaining issues on CBG-based (re)transmission11 , 3GPP Draft; RI-1800075, 3rd Generation Partnership Project (3GPP), Mobile Competence Centre ; 650, Route Des Lucioles ; F-06921 Sophia-Antipolis Cedex ; France, vol. RAN WGI, No. Vancouver, Canada; Jan. 22, 2018-Jan. 26, 2018 Jan. 13, 2018, XP051384578, Retrieved from the Internet: URL:http://www.3gpp.org/ftp/tsg%5Fran/WG1% 5FRL1/TSGR1%5FAH/NR%5FAH% 5F1801/Docs/ [retrieved on Jan. 13, 2018], pp. 1-2.

Huawei, Hisilicon: "Enabling Multiple NR-PDCCH for Multiple TRP Transmission," 3GPP TSG RAN WG1 Meeting #91, R1-1719816, Reno, USA, Nov. 27-Dec. 1, 2017, 3 Pages.

Office Action for Chinese Application No. 202011148188.6, dated Aug. 11, 2023, 19 pages.

Notice of Allowance for Chinese Patent Application No. 202011148188.6 dated Feb. 29, 2024, 8 pgs.

\* cited by examiner

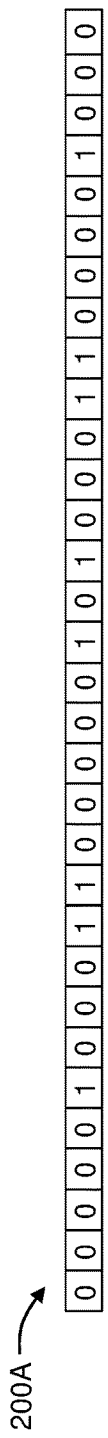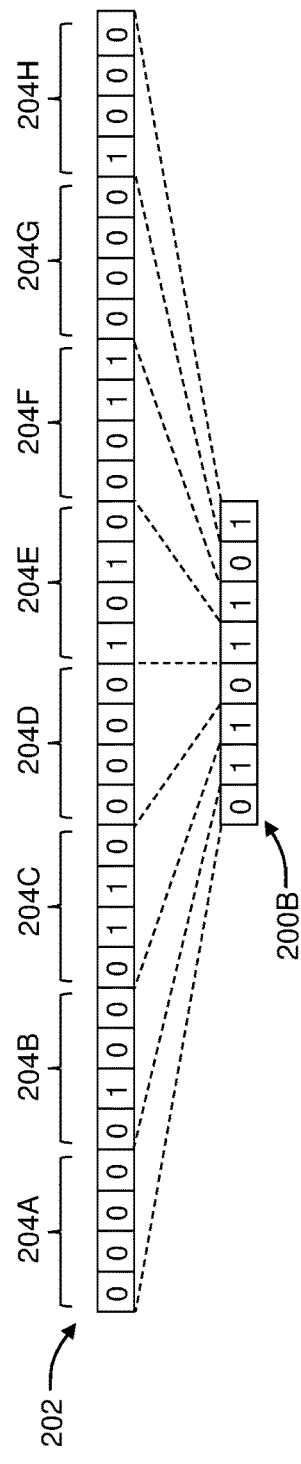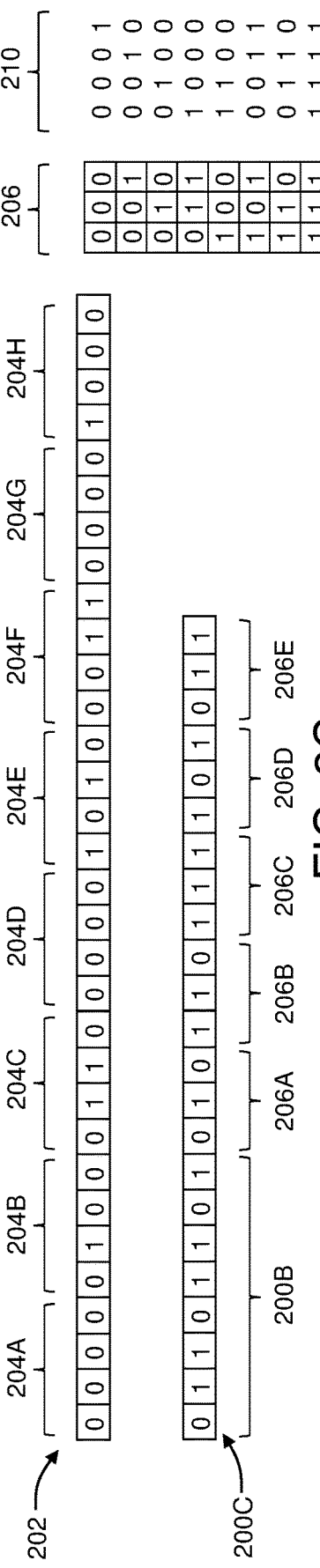
FIG. 2A
FIG. 2B
FIG. 2C

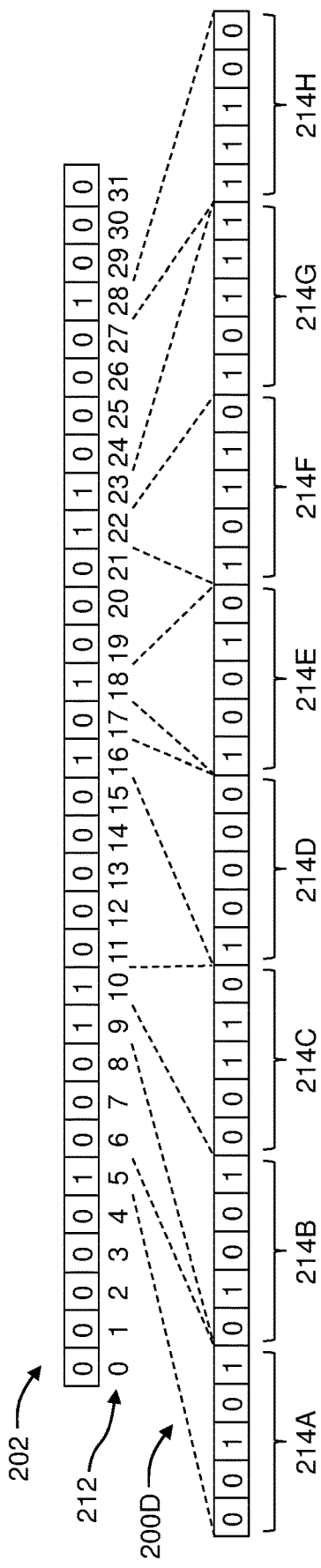
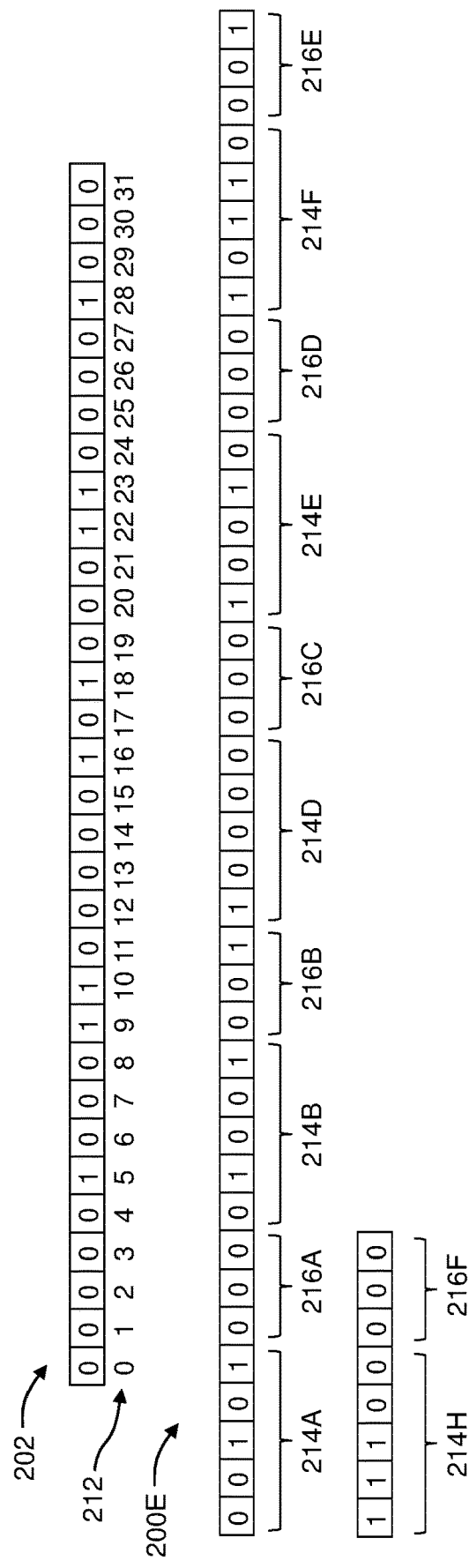
FIG. 2D
FIG. 2E

FEEDBACK AND RETRANSMISSION FORMAT OF HARQ PROTOCOL

CROSS-REFERENCE TO RELATED APPLICATION

This application is a continuation of U.S. patent application Ser. No. 17/022,366, filed on Sep. 16, 2020 titled "FEEDBACK AND RETRANSMISSION FORMAT OF HARQ PROTOCOL", which claims the benefit of and priority to U.S. Provisional Application Ser. No. 62/932,937 filed Nov. 8, 2019 titled "HARQ: FEEDBACK AND RETRANSMISSION," the disclosures of which are incorporated herein by reference in their entireties.

FIELD

The implementations discussed herein relate to feedback and retransmission format of a Hybrid Automatic Repeat Request (HARQ) protocol.

BACKGROUND

Unless otherwise indicated in the present disclosure, the materials described in the present disclosure are not prior art to the claims in the present application and are not admitted to be prior art by inclusion in this section.

Some wireless communication standards, such as some Wi-Fi standards, implement Link Adaptation (LA) to adapt transmissions from a specific transmitter to a specific receiver to fulfill a certain failure rate requirement. In particular, the transmitter may adapt its transmission based on feedback provided by the receiver in the form of a channel quality indicator. The transmitter may determine, based on the feedback, an appropriate transmission scheme to fulfill the failure rate requirement.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an implementation, a method includes sending wireless data to a receiver node. The method includes receiving feedback from the receiver node that identifies a subset of the wireless data that the receiver node failed to receive correctly and that includes a token value as a label for the subset of the wireless data as a group. The method includes constructing retransmission wireless data that includes the subset of the wireless data and the token value. The method includes sending the retransmission wireless data to the receiver node. The receiver node may be a first client device. The method includes allocating, at an AP, a first set of token values to the first client device in a network served by the AP. The method includes allocating, at the AP, a second set of token values to a second client device in the network, the second set of token values not overlapping with the first set of token values. The method includes notifying the first client device of the first set of token values for retransmissions requested by the first client device. The method includes notifying the second client device of the second set of token values for retransmissions requested by the second client device.

In another implementation, a method includes sending wireless data to a receiver node. The method includes receiving feedback from the receiver node that identifies a subset of the wireless data that the receiver node failed to receive correctly and that includes a token value as a label for the subset of the wireless data as a group. The token value includes at least a portion of a unique identifier of the receiver node. The method includes constructing retransmission wireless data that includes the subset of the wireless data and the token value. The method includes sending the retransmission wireless data to the receiver node.

In another implementation, a method includes sending wireless data to a receiver node. The method includes receiving feedback from the receiver node that identifies a subset of the wireless data that the receiver node failed to receive correctly and that includes a token value as a label for the subset of the wireless data as a group. The method includes constructing retransmission wireless data that includes the subset of the wireless data and the token value. The method includes sending the retransmission wireless data to the receiver node. The method includes sending second retransmission wireless data to a second receiver node. The retransmission wireless data and the second retransmission wireless data are sent to the receiver node and the second receiver node in a same signaling frame. The retransmission wireless data and the second retransmission wireless data have orthogonal encoding or a retransmission signal field of the signaling frame is separated into a first field for the receiver node and a second field for the second receiver node.

In another implementation, a method includes receiving wireless data from a sender node at a receiver node, the wireless data including multiple codewords. The method includes failing to receive correctly a subset of the plurality of codewords. The method includes generating feedback that identifies at least the subset of the codewords for retransmission by the sender node. The method includes sending the feedback to the sender node to request retransmission by the sender node of at least the subset of the codewords. At least one of the following applies: the feedback enables or disables HARQ retransmission at the sender node; the feedback has a format type selected from among multiple format types understandable by the sender node and the feedback identifies the format type; the feedback includes a token value as a label for the subset of the codewords as a group; or a transmission parameter of the receiver node to send the feedback to the sender node is selected based on a channel quality indicator of a channel from the receiver node to the sender node. The feedback enables or disables HARQ retransmission at the sender node based on a quantity of the subset of the codewords. The feedback enables HARQ retransmission at the sender node if the quantity of the subset of the codewords is less than a threshold by requesting retransmission by the sender node of at least the subset of the codewords without requesting retransmission of all of the codewords. The feedback disables HARQ retransmission at the sender node if the quantity of the subset of the codewords is greater than the threshold by requesting retransmission by the sender node of all of the codewords.

BRIEF DESCRIPTION OF THE DRAWINGS

Example implementations will be described and explained with additional specificity and detail through the use of the accompanying drawings in which:

FIGS. 2A-2F illustrate various example bitmaps as codeword-level HARQ feedback with different format types;

DETAILED DESCRIPTION

Figure 1:
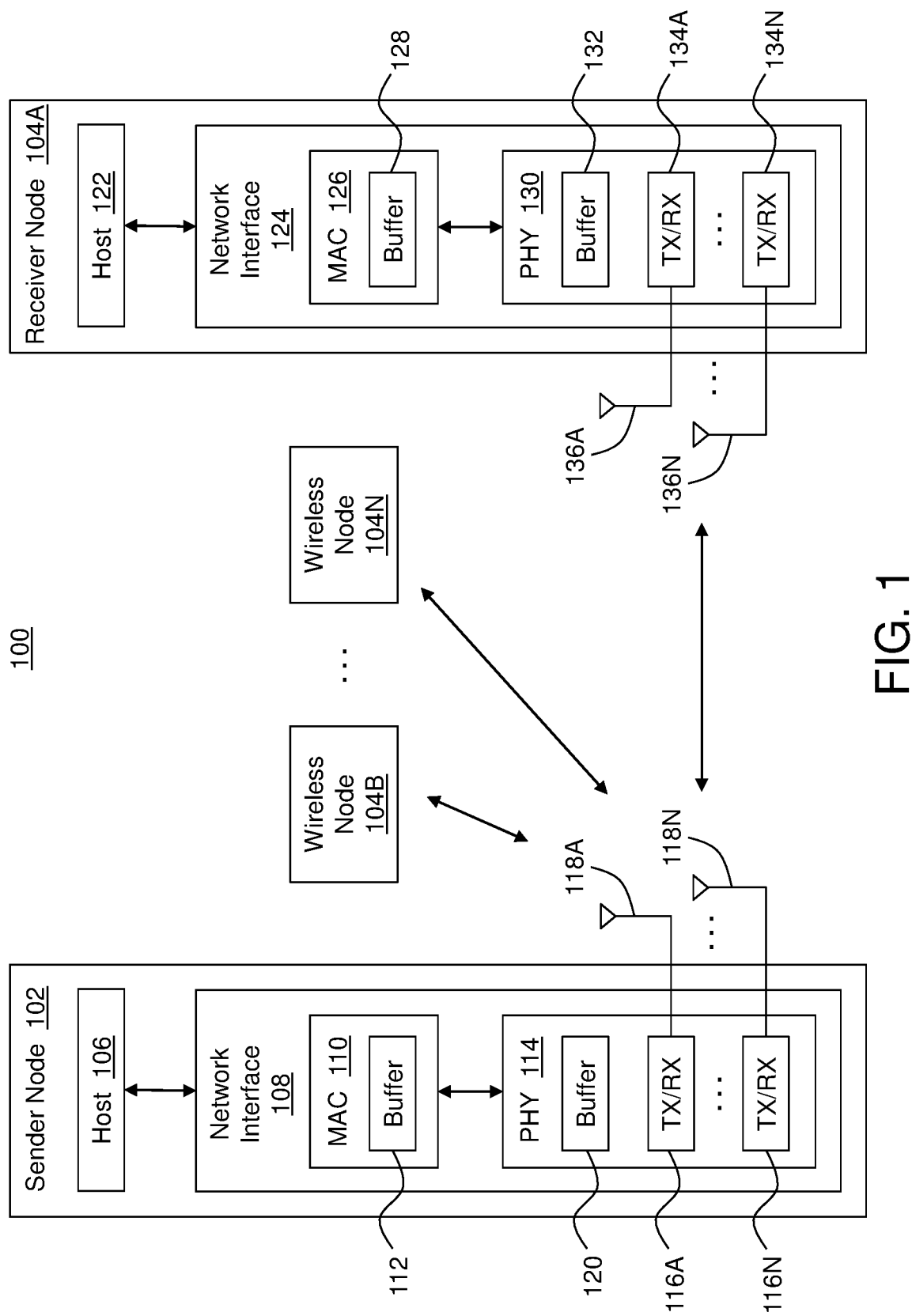
FIG. 1 is a block diagram of an example wireless local area network in which a HARQ protocol may be implemented.

LA may ensure that transmissions in a wireless network are successful most of the required time (depending on the failure rate requirement) with certain transmission parameters, such as a particular modulation and coding scheme (MCS), for current channel conditions. In some circumstances, the supported transmission parameter(s) may provide lower throughput or data rate than is required or expected.

When the throughput or data rate is lower than required or expected, it can be addressed by, e.g., the receiver discarding the received data which was not received correctly, e.g., received data which was not decoded successfully, and asking for a retransmission of the data from the transmitter. The transmitter may select a lower MCS than the original data to ensure—or at least increase the likelihood—that on the retransmission the data is received correctly at the receiver. This process may be referred to as Automatic Repeat Request (ARQ).

Alternatively, rather than reducing the transmission parameters (e.g., MCS) to lower levels, the receiver may store the data that failed to receive correctly and send feedback to the transmitter to request retransmission of the data or a punctured version of the data one or more times. The receiver may then combine the data from the original transmission and one or more resulting retransmissions and correctly receive the data based on the combination. This process may be referred to as HARQ.

Some implementations herein relate to feedback and retransmission formats for HARQ protocols and how these are implemented. The feedback may be codeword-level feedback where the number of codewords in each transmission is relatively large. The feedback may include a bitmap that has fewer bits than the number codewords in the transmission. Implementations described herein may implement as codeword-level feedback bitmaps with any one or more of various format types in which the bitmap has fewer bits than the number of codewords in the transmission. Where the transmitter and receiver both understand multiple format types, the feedback may also identify the particular format type of the feedback in the feedback itself, e.g., in a corresponding field of a feedback packet.

Alternatively or additionally, the receiver may enable or disable HARQ at the transmitter depending on a number of the failed codewords. For example, if the number of failed codewords is relatively low, e.g., below a threshold, the receiver may enable HARQ at the transmitter by requesting retransmission of just the failed codewords. On the other hand, if the number of failed codewords is relatively high, e.g., above the threshold, the receiver may disable HARQ at the transmitter by requesting retransmission of the entire original transmission rather than just the failed codewords.

The feedback generated by the receiver may include a token value to identify multiple failed codewords together as a group. As such, the retransmission generated by the sender node and sent to the receiver node may include the token value to identify the group as a whole, which may require less overhead than identifying each of the failed codewords of the group individually. In some implementations, the receiver may include in the feedback multiple token values, e.g., one each for each of multiple groups of failed codewords. The use of multiple token values to break up a large number of failed codewords into multiple groups allows the transmitter to divide retransmission of the failed codewords across multiple packets.

Accordingly, some implementations described herein allow a receiver to dynamically enable or disable HARQ at the transmitter. The receiver may generate codeword-level feedback having fewer bits than a number of codewords in the original transmission received from the transmitter to reduce overhead of the feedback. The receiver may in some implementations select any one of multiple possible format types to optimize the feedback based on, e.g., a pattern of the failed codewords. The transmitter may retransmit codewords identified in feedback as failed codewords and may identify the retransmitted codewords as a group using a token value, which may significantly reduce retransmission overhead compared to individually identifying each retransmission codeword.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 is a block diagram of an example wireless local area network (WLAN) 100 in which a HARQ protocol may be implemented. The WLAN 100 includes multiple wireless nodes 102, 104A-104N (collectively wireless nodes 104). As illustrated, the wireless node 102 is implemented as an access point (AP) and each of the wireless nodes 104 is implemented as a wireless client device or station (STA).

For example, the wireless node 102 may include a gateway, a repeater, a mesh node, and/or other suitable AP for wireless stations or devices such as the wireless nodes 104. The wireless node 102 may connect to the Internet and/or a core network via a bridge, a backhaul link, a base station, and/or other suitable devices or connections.

Each of the wireless nodes 104 may include a desktop computer, a laptop computer, a tablet computer, a mobile phone, a smartphone, a printer, a smart television, a digital video disc (DVD) player, a security camera, a smart device, or any other device configured for wireless communication. The WLAN 100 includes multiple wireless nodes 104. Although three wireless nodes 104 are illustrated in FIG. 1, the WLAN 100 can include different numbers (e.g., 1, 2, 4, 5, 6, etc.) of wireless nodes 104 in other implementations.

In these and other implementations, each of the wireless nodes 102, 104 may implement one or more of the IEEE 802.11 protocols which are contention-based protocols to handle communications among multiple competing devices for a shared wireless communication medium on a selected one of multiple communication channels. The frequency range of each communication channel is specified in the corresponding one of the IEEE 802.11 protocols being implemented, e.g. "a", "b", "g", "n", "ac", "ad", "ax".

In general, the wireless nodes 102, 104 may be configured to communicate wirelessly with each other, including sending and receiving wireless data, e.g. in the form of packets. Each of the wireless nodes 102, 104 may be considered a sender node when sending data or a receiver node when receiving data. In various examples described herein, for instance, the wireless node 102 may transmit and retransmit data to the wireless node 104A and the wireless node 104A may receive data and request retransmission of at least some of the data from the wireless node 102. In these examples, the wireless node 102 may be referred to as a sender node 102 while the wireless node 104A may be referred to as a receiver node 104A.

As illustrated in FIG. 1, the sender node 102 includes a host processor 106 coupled to a network interface 108. The network interface 108 includes a medium access control (MAC) layer that includes a MAC processor 110 with or coupled to a MAC buffer 112 (e.g., a MAC-level transmit (TX) and/or receive (RX) buffer), and a physical (PHY) layer that includes a PHY processor unit 114. The PHY processor unit 114 includes one or more transceivers 116A-116N (collectively transceivers 116), and the transceivers 116 are coupled to one or more antennas 118A-118N (collectively antennas 118). The PHY processor unit 114 includes or is coupled to a PHY buffer 120 (e.g., a PHY-level TX and/or RX buffer). Although two transceivers 116 and two antennas 118 are illustrated in FIG. 1, the sender node 102 can include different numbers (e.g., 1, 2, 4, 5, etc.) of transceivers 116 and antennas 118 in other implementations.

As illustrated, the receiver node 104 includes a host processor 122 coupled to a network interface 124. Similar to the network interface 108, the network interface 124 may include both a MAC layer and a PHY layer. In particular, the network interface 124 includes a MAC processor unit 126 with or coupled to a MAC buffer 128 and a PHY processor unit 130 with or coupled to a PHY buffer 132. The PHY processor unit 130 includes one or more transceivers 134A-134N (collectively transceivers 134A), and the transceivers 134 are coupled to one or more antennas 136A-136N (collectively antennas 136). Although two transceivers 134 and two antennas 136 are illustrated in FIG. 1, the receiver node 104A can include different numbers (e.g., 1, 2, 4, 5, etc.) of transceivers 134 and antennas 136 in other implementations.

One or more of the wireless nodes 104B-104N may have a structure the same as or similar to the receiver node 104A.

In an example, the sender node 102 and the receiver node 104A implement a HARQ protocol. Any suitable HARQ protocol may be implemented in the WLAN 100 of FIG. 1 and other environments described herein. For example, the HARQ protocol implemented in the WLAN 100 of FIG. 1 and other environments described herein may include Type I HARQ, Type II HARQ, HARQ with soft combining, HARQ with Chase combining, Incremental Redundancy HARQ (IR-HARQ), or other suitable HARQ protocol.

In all HARQ implementations in the WLAN 100 and other environments herein, original wireless data, e.g., wireless data being sent for the first time, is sent from the sender node 102 to the receiver node 104A (or other wireless node 104). If the receiver node 104A fails to decode or otherwise fails to correctly receive some or all of the original wireless data, retransmission wireless data that includes some or all of the original wireless data may be sent by the sender node 102 to the receiver node 104A. In some implementations, the receiver node 104A may specify specific portions of the original wireless data that failed to receive correctly to request that generally only those portions of the original wireless data be included in the retransmission packet. Alternatively or additionally, the retransmission wireless data may include error correcting information such as forward error correction (FEC) parity bits to decode the original wireless data when Type II HARQ is implemented, and/or additional parity information to decode the original wireless data when IR-HARQ is implemented.

In HARQ, when the retransmission wireless data includes all of the original wireless data, the receiver node 104A may decode the original wireless data based solely on the retransmission wireless data and exclusive of the failed wireless data, or the receiver node 104A may soft combine the retransmission wireless data and the failed wireless data to decode the original wireless data based on both the retransmission wireless data and the failed wireless data. When the retransmission wireless data includes some but not all of the original wireless data, the receiver node 104A may soft combine the retransmission wireless data and the failed wireless data to decode the original wireless data based on both the retransmission wireless data and the failed wireless data. When the retransmission wireless data includes error correction information, the receiver node 104A may decode the original wireless data based on the retransmission wireless data, e.g., by applying the error correction information to the failed wireless data.

For simplicity, the above implementation is described herein in the context of the sender node 102 sending wireless data and HARQ retransmissions to the receiver node 104A. More generally, implementations described herein may involve sending wireless data and HARQ retransmissions from one wireless node 102, 104 to another wireless node 104, 102.

In more detail, the sender node 102 prepares data for transmission as MAC protocol data units (MPDUs) in an aggregate MPDU (A-MPDU) at the MAC (e.g., at the MAC processor unit 110) which A-MPDU is changed to codewords at the PHY (e.g., at the PHY processor unit 114) and transmitted as wireless data, e.g., in a wireless packet, to the receiver node 104A. The MPDUs may be buffered in the MAC buffer 112, e.g., for MPDU-level retransmissions. Alternatively or additionally, the codewords may be buffered in the PHY buffer 120, e.g., for codeword-level retransmissions.

The receiver node 104A receives the wireless data and processes it at the PHY layer of the receiver node 104A (e.g., the PHY processor unit 130). In particular, the PHY processor unit 130 receives the wireless data, e.g., a bitstream, and parses the bitstream into codewords. The PHY processor unit 130 may error check the codewords for codeword-level errors and may identify one or more codeword-level errors. In some implementations, the PHY processor unit 130 may buffer one or more codewords in the PHY buffer 132, e.g., to be combined subsequently with retransmitted codewords in the HARQ procedure according to a log likelihood ratio (LLR) combination or other soft combining process. MPDUs making up an A-MPDU are generated from the codewords, e.g., by one or both of the PHY processor unit 130 and the MAC processor unit 126. The MAC processor unit 126 may error check the MPDUs for MPDU-level errors and may identify one or more MPDU-level errors (e.g., undecodable or incorrectly decoded MPDUs) and/or one or more correctly received MPDUs (e.g., successfully decoded MPDUs). The MAC processor unit 126 may buffer one or more MPDUs in the MAC buffer 128.

The receiver node 104A may then generate feedback based on one or both of the error checking at the PHY layer or the error checking at the MAC layer of the receiver node 104A. The feedback may identify MPDU-level errors, codeword-level errors, or both MPDU-level errors and codeword-level errors. The feedback may be referred to as two-tier feedback when it identifies both MPDU-level errors and codeword-level errors. Additional details regarding two-tier feedback for HARQ are described in U.S. patent application Ser. No. 16/676,141 filed Nov. 6, 2019. The 16/676,141 application is incorporated herein by reference. Example two-tier feedback may include a negative acknowledgement (NACK) that indicates and/or identifies at least one of: failed codewords, received codewords, failed MPDUs, or received MPDUs.

The feedback generated by the receiver node 104A may be lossless or lossy. Lossless feedback identifies for retransmission by the sender node 102 only codewords that failed to receive correctly. Lossy feedback identifies for retransmission by the sender node 102 both codewords that failed to receive correctly and some codewords that were received correctly.

Alternatively or additionally, the receiver node 104A may enable or disable HARQ retransmission at the sender node 102, e.g., based on a quantity of failed codewords (e.g., codewords that are not received correctly) or failed MPDUs (e.g., MPDUs that are not received correctly) of the wireless data. For example, if the quantity of failed codewords or failed MPDUs is less than a threshold value, the receiver node 104A may enable HARQ retransmission at the sender node 102 by generating feedback that requests retransmission of the failed codewords or failed MPDUs without requesting retransmission of all the codewords of the wireless data, all the MPDUs of the wireless data, or more generally the entire wireless data. As another example, if the quantity of failed codewords or failed MPDUs is greater than the threshold value, the receiver node 104A may disable HARQ retransmission at the sender node 102 by generating feedback that requests retransmission of all the codewords of the wireless data, all the MPDUs of the wireless data, or more generally the entire wireless data.

Where the feedback includes MPDU-level feedback, such as a Block-ACK, a bitmap of up to 128 bits may be used to acknowledge the MPDUs. A bitmap of 128 bits or less is relatively small and does not consume many resources to transmit to the sender node 102. In comparison, codeword-level feedback requires a much larger bitmap if there is one bit per codeword as there are many more codewords than MPDUs in a wireless packet. Accordingly, in some implementations described herein, codeword-level feedback is compressed or otherwise has fewer bits than a per codeword bitmap. For example, if the wireless data has N codewords, the feedback may have not more than M bits to identify the codewords that failed to receive correctly, where M is less than N.

Implementations described herein include various format types for codeword-level feedback that has fewer bits than a per codeword bitmap. Example format types for such codeword-level feedback include: a grouped codeword bitmap; a grouped codeword bitmap with failure patterns; a list of bitmap indices of failed codewords; a list of bitmap start indices of failed codewords with run length; a probabilistic data structure; and a compressed per codeword bitmap. Each of the foregoing format types are described in more detail elsewhere herein.

The receiver node 104A may generally generate feedback with a format type that is understandable by the sender node 102. In some implementations, the receiver node 104A and the sender node 102 understand multiple format types. Accordingly, the receiver node 104A may generate the feedback with one of the format types and the feedback may identify the format type. For example, a packet with the feedback (hereinafter "feedback packet") sent by the receiver node 104A to the sender node 102 may include a signaling field that identifies the format type. Upon receipt of the feedback packet, the sender node 102 may read the signaling field to determine the format type to properly interpret the feedback included in the feedback packet.

Where the receiver node 104A and the sender node 102 understand multiple format types, the receiver node 104A may identify a pattern of the codewords that failed to receive correctly. Some patterns of codeword failures may compress better with one format type than another. Thus, the receiver node 104A may select the format type based on the pattern of the codeword failures.

In some implementations, the feedback generated by the receiver node 104A may include a token value as a label for the codewords that failed to receive correctly. Alternatively or additionally, the feedback may include multiple token values, each corresponding to a different subset of the codewords that failed to receive correctly. The token value or values may each uniquely identify a set or subset of codewords that failed to receive correctly. When the sender node 102 sends retransmission wireless data, the sender node 102 may include in the retransmission wireless data a corresponding token value for each corresponding set or subset of codewords that is in the retransmission wireless data. When the receiver node 104A receives the retransmission wireless data with the token value(s), it may determine from the token value(s) which retransmission codewords are included in the wireless data. Using token values in the retransmission wireless data to identify sets of retransmission codewords may use substantially less overhead than per codeword identification.

The receiver node 104A may have a unique identifier assigned to it, e.g., by the sender node 102. For example, where the sender node 102 is an AP and the receiver node 104A is a STA, the sender node 102 may allocate a unique STA ID to each of the receiver node 104A and the other wireless nodes 104 upon association with the sender node 102. The receiver node 104A may include at least a portion of its unique identifier in each token value it generates to avoid inadvertently using a same token value as other wireless nodes 104 that may be requesting retransmission from the sender node 102. Alternatively or additionally, the sender node 102 may allocate a different set of token values to each of the receiver node 104A and the other wireless nodes 104 and may notify them of the token value allocations so that the receiver node 104A and the other wireless nodes 104 do not inadvertently request retransmission from the sender node 102 using the same token value.

In some implementations, a transmission parameter of the receiver node 104A to send the feedback to the sender node 102 may be selected based on a channel quality indicator of a channel from the receiver node 104A to the sender node 102. The transmission parameters may include MCS, number of streams, or other suitable transmission parameters.

The sender node 102 receives the feedback from the receiver node 104A and may or may not send a HARQ retransmission depending on the feedback. For example, if the feedback requests retransmission of failed codewords or failed MPDUs without requesting retransmission of all the codewords or all the MPDUs, the sender node 102 may send a HARQ retransmission, e.g., retransmission wireless data that includes retransmission codewords or MPDUS corresponding to the failed codewords or MPDUs. Alternatively, if the feedback requests retransmission of all the codewords, all the MPDUs, or more generally all the wireless data (e.g., a wireless packet) sent previously, the sender node 102 may send an ARQ retransmission.

Where the feedback requests retransmission of failed codewords or failed MPDUs only, the sender node 102, e.g., the PHY layer and/or the MAC layer of the sender node 102, constructs retransmission wireless data, e.g., in the form of one or more retransmission packets, that may include retransmission codewords that correspond to the failed codewords or retransmission MPDUs that correspond to the failed MPDUs. For example, the PHY layer of the sender node 102 may retrieve codewords indicated as the failed codewords in the feedback from the PHY buffer 120 and may include the retrieved codewords in the retransmission wireless data as the retransmission codewords.

The retransmission wireless data may be sent to the receiver node 104A without new data, e.g., in a dedicated HARQ session in which retransmissions and feedback are exchanged between the sender node 102 and the receiver node 104A until all the wireless data is received correctly or until a timeout is reached. Alternatively, the retransmission wireless data may be sent to the receiver node 104A together with new wireless data. Additional details regarding dedicated HARQ sessions and retransmission together with transmission of new data are disclosed in the 16/676,141 application.

In some implementations, multiple wireless nodes 104 may send feedback to request retransmissions from the sender node 102 and the sender node 102 may send retransmission wireless data to each of the wireless nodes 104 that have requested retransmissions in a single signaling frame. For example, the sender node 102 may orthogonally encode, e.g., on different tones, first retransmission wireless data for the receiver node 104A and second retransmission wireless data for the wireless node 104B to send each in the same signaling frame. As another example, a retransmission signal field of the signaling frame may be separated into a first field for the receiver node 104A and a second field for the wireless node 104B. When the retransmission signal field is separated into the first and second fields, each of the first and second fields may end up on different modulated symbols.

FIGS. 2A-2F illustrate various example bitmaps 200A-200F as codeword-level HARQ feedback with different format types. For example, the receiver node 104A or other wireless nodes 104 of FIG. 1 may be configured to generate feedback with at least one of the format types of FIGS. 2A-2F. Alternatively or additionally, the receiver node 104A, the sender node 102, and/or the other wireless nodes 104 may understand two or more of the format types of FIGS. 2A-2F and the receiver node 104A may select one of the format types for its feedback, e.g., based on patterns of codeword failures or other criteria.

The bitmap 200A of FIG. 2A has a format type of per codeword bitmap and may be referred to as a per codeword bitmap 200A. That is, the per codeword bitmap 200A of FIG. 2A may have a same length as the number of codewords in the received wireless data (e.g., packet). The length of the per codeword bitmap 200A of FIG. 2A and other bitmaps herein is short for illustration purposes; in practice, the actual length may be longer than illustrated. In the per codeword bitmap 200A of FIG. 2A, a value of zero in a position in the per codeword bitmap 200A indicates that the codeword corresponding to the position was received correctly, while a value of one in a position indicates that the codeword corresponding to the position was not received correctly and should be retransmitted. The meaning of the values of zero and one in this and other format types may be reversed, if desired.

In the per codeword bitmap 200A of FIG. 2A, each codeword that is not correctly received is individually identified, e.g., on a per codeword basis. As such, when the sender receives feedback in the per codeword bitmap 200A, it may retransmit only those codewords whose bit in the per codeword bitmap 200A is set to one. Thus, the per codeword bitmap 200A of FIG. 2A is an example of lossless feedback.

Figure 2F:
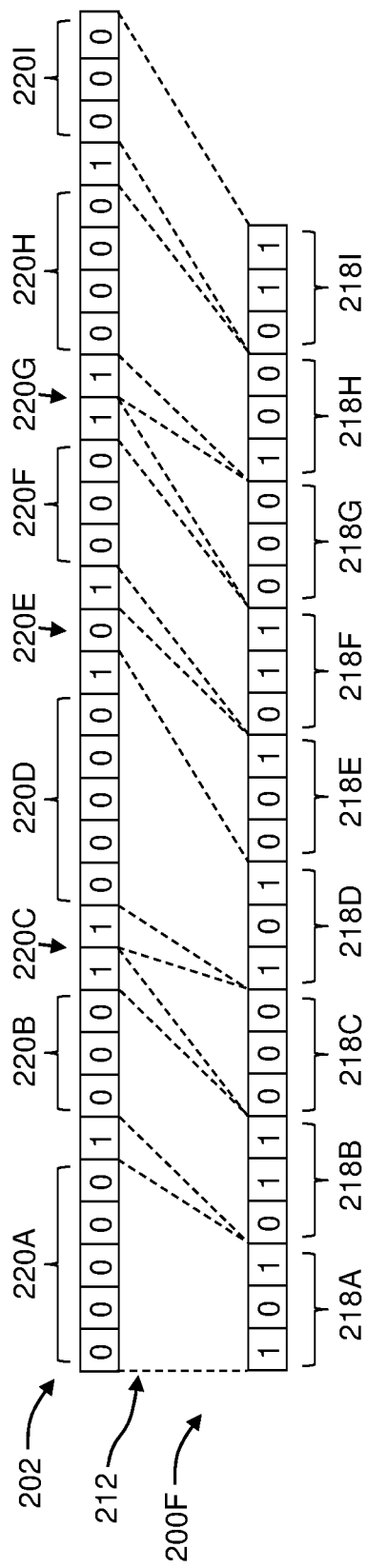

The per codeword bitmap 200A of FIG. 2A requires a number of bits equal to the number of codewords for the feedback. Depending on the size of the packet, this could lead to a payload of codeword-level feedback that is significantly higher than MPDU-level feedback. However, in regular operation, the vast majority of codewords are expected to be received correctly. As such, it is expected that the per codeword bitmap 200A will be sparsely populated with ones, in which case the size of the feedback sent to the sender node may be reduced by some format types compared to the per codeword bitmap 200A. Examples of format types that may have reduced size compared to the per codeword bitmap 200A are described, e.g., with respect to FIGS. 2B-2F.

The size of the per codeword bitmap 200A of FIG. 2A may be a concern due to the number of codewords when the sender node transmits wireless data to the receiver node at the highest MCS and maximum number of streams. In some implementations, however, the size of the per codeword bitmap 200A may not be a problem considering the reciprocity of the channel/link. For example, if the downlink, e.g., the link from the sender node to the receiver node, can support the highest MCS and maximum number of streams then the uplink, e.g., the link from the receiver node to the sender node, may also support the highest MCS and maximum numbers of streams as well. Thus, the size of the per codeword bitmap 200A of FIG. 2A may not be a problem for links with good signal to noise ratio (SNR).

The bitmap 200B of FIG. 2B has a format type of grouped codeword bitmap and may be referred to as a grouped codeword bitmap 200B. In this and other examples (e.g., FIGS. 2C-2F), the receiver node may generate and/or store locally a per codeword bitmap 202 that is not sent to the sender. The per codeword bitmap 202 uses a value of zero or one in each position of the per codeword bitmap to indicate whether the codeword corresponding to the position was received correctly or not, e.g., a value of zero may indicate the codeword was received correctly while a value of one may indicate that it was not received correctly, or vice versa.

To reduce the length of the feedback that the receiver node sends to the sender node compared to sending the entire per codeword bitmap 202, the grouped codeword bitmap 200B of FIG. 2B uses a single bit for each group 204A-204H (hereinafter collectively "groups 204" or generically "group 204") of adjacent codewords in the per codeword bitmap 202. If at least one of the codewords in a group 204 is not received correctly, the corresponding bit in the grouped codeword bitmap 200B may be set to a value of one. For example, each of groups 204B, 204C, 204E, 204F, and 204H has at least one codeword in error such that the second, third, fifth, sixth, and eighth bits in the grouped codeword bitmap 200B may be set to one. If all codewords in a group 204 are received correctly, the corresponding bit in the grouped codeword bitmap 200B may be set to a value of zero. For example, all the codewords in each of groups 204A, 204D, and 204G is received correctly such that the first, fourth, and seventh bits in the grouped codeword bitmap 200B may be set to zero.

In the example of FIG. 2B, each group 204 has a length of four codewords. More generally, each group 204 may have a length of two or more codewords.

The grouped codeword bitmap 200B of FIG. 2B may be useful, e.g., when codeword errors appear in clusters. In some implementations, the receiver node may analyze the per codeword bitmap 202 for patterns and if it identifies that the failed codewords appear in clusters, it may use the grouped codeword bitmap 200B for the feedback sent to the sender node.

In the grouped codeword bitmap 200B of FIG. 2B, there is no distinction between different error patterns within a group 204. As such, when the sender receives the grouped codeword bitmap 200B as feedback, it may retransmit all codewords in each group 204 whose bit in the grouped codeword bitmap 200B is set to one. This may lead to some codewords that were received correctly at the receiver node being retransmitted to the receiver node. Thus, the grouped codeword bitmap 200B of FIG. 2B is an example of lossy feedback.

The bitmap 200C of FIG. 2C has a format type of grouped codeword bitmap with failure patterns and may be referred to as a grouped codeword bitmap with failure patterns 200C. As in FIG. 2B, in FIG. 2C the receiver node may generate and/or store locally the per codeword bitmap 202 and may also generate the grouped codeword bitmap 200B as part of the grouped codeword bitmap with failure patterns 200C.

In addition, the grouped codeword bitmap with failure patterns 200C includes pattern codes 206-206E (hereinafter collectively "pattern codes 206" or generically "pattern code 206") appended to the grouped codeword bitmap 200B. A pattern code 206 is appended to the grouped codeword bitmap 200B for each of the groups 204B, 204C, 204E, 204F, and 204H with at least one codeword in error. In particular, the pattern code 206A is appended for the group 204B, the pattern code 206B is appended for the group 204C, the pattern code 206C is appended for the group 204E, the pattern code 206D is appended for the group 204F, and the pattern code 206E is appended for the group 204H.

A dictionary 208 may be used by the receiver node, and the sender node upon receipt of the grouped codeword bitmap with failure patterns 200C as feedback, to translate between failure patterns 210 and pattern codes 206. For example, the group 204B has a failure pattern of 0 1 0 0 which in the third line of the dictionary 208 translates to the pattern code 206A of 0 1 0 that is appended to the grouped codeword bitmap 200B in the grouped codeword bitmap with failure patterns 200C. Thus, when the sender node receives the grouped codeword bitmap with failure patterns 200C, it knows from the grouped codeword bitmap 200B that the group 204B had at least one codeword failure and it knows from the appended pattern code 206A the specific failure pattern 210 of the group 204B. As such, the sender node may include for the group 204B only the second codeword of the group 204B in the retransmission wireless data rather than including the entire group 204B.

The length of each of the pattern codes 206 is less than the length of each of the failure patterns 210. This compresses the feedback sent back to the sender node compared to appending the complete failure pattern of each group 204 with at least one failed codeword. In other implementations, the receiver node may append, instead of pattern codes 206, a complete failure pattern for each group 204 with at least one failed codeword to the grouped codeword bitmap 200B.

Because the length of each of the pattern codes 206 is less than the length of each of the failure patterns 210, every possible failure pattern for the groups 204 is not listed in the dictionary 208. Where a group 204 has a specific failure pattern that is not listed in the dictionary 208, the receiver node may append instead any of the pattern codes 206 that has a failure pattern 210 that encompasses at least the specific failure pattern 210. For example, the group 204E has a failure pattern of 1 0 1 0 which is not listed in the failure patterns 210 of the dictionary 208. However, the last failure pattern 210 in the dictionary 208 is 1 1 1 1, which encompasses the failure pattern 1 0 1 0 of the group 204E. That is, the last failure pattern 210 in the dictionary 208 indicates a failed codeword in at least the same bit positions (e.g., first and third) as the failure pattern of the group 204E such that the pattern code 206C of 1 1 1 from the last line of the dictionary 208 may be appended for the group 204E. When the sender node receives the grouped codeword bitmap with failure patterns 200C and reads the pattern code 206C, the sender node may include for the group 204E all the codewords of the group 204E in the retransmission wireless data since the pattern code 206C of 1 1 1 specifies a failure pattern that is over inclusive. In some implementations, the pattern code of 1 1 1 in the last line of the dictionary 208 may be used as a catchall for any failure patterns not specified in the dictionary 208, such as at least the following failure patterns: 0 1 0 1, 1 0 1 0, 1 0 0 1, 1 1 0 1, and 1 0 1 1, 1 1 1 0, and 0 1 1 1.

While the example of FIG. 2C uses a 4-to-3 dictionary 208, e.g., a dictionary that encodes four-bit failure patterns as three-bit pattern codes in the grouped codeword bitmap with failure patterns 200C, other implementations may use different dictionaries. For example, other implementations may use a 4-to-2 dictionary which would further reduce the size of the feedback sent to the sender node while increasing the size of the retransmission sent to the receiver node compared to using a 4-to-3 dictionary. More generally, implementations herein may use an X-to-Y dictionary where X and Y are positive integers, X is the size of each group of codewords and of each failure pattern in the dictionary, Y is the size of each pattern code in the dictionary, X is greater than Y, and Y is greater 1.

In the grouped codeword bitmap 200B of FIG. 2B, there is some distinction between some but not all possible failure patterns. As such, when the sender receives the grouped codeword bitmap with failure patterns 200C as feedback, it may retransmit all codewords in some of the groups 204 whose bit in the grouped codeword bitmap 200B is set to one while retransmitting only those codewords that failed in others of the groups 204 whose bit in the grouped codeword bitmap 200C is set to one. The result is that for some groups 204, all codewords are retransmitted, including some that were received correctly at the receiver node, while for other groups, only those codewords that were received in error are retransmitted. Thus, the grouped codeword bitmap with failure patterns 200C of FIG. 2C is an example of lossy feedback, albeit less lossy than the grouped codeword bitmap 200B of FIG. 2B.

The bitmap 200D of FIG. 2D has a format type of list of bitmap indices of failed codewords and may be referred to as a list of bitmap indices of failed codewords 200D. As in FIG. 2B, in FIG. 2D the receiver node may generate and/or store locally the per codeword bitmap 202. For illustration purposes, FIG. 2D includes the indices 212 of all positions or locations in the per codeword bitmap 202.

In the example of FIG. 2D, the receiver node populates the list of bitmap indices of failed codewords 200D with the index of each position in the per codeword bitmap 202 that corresponds to a failed codeword, e.g., each position in the per codeword bitmap 202 with a value of one. For example, the first codeword represented by the per codeword bitmap 202 that was not received correctly is the sixth codeword as indicated by the sixth position in the per codeword bitmap 202 having a value of one. In addition, as shown by the indices 212, the sixth position in the per codeword bitmap 202 has an index of 5. Thus, a first entry 214A in the list of bitmap indices of failed codewords 200D is the index of the sixth codeword, shown here as a five-digit binary number. Other entries in the list of bitmap indices of failed codewords 200D may similarly be five-digit binary numbers. In other implementations, each of the entries in the list of bitmap indices of failed codewords 200D may have some other length, e.g., two-digit, three-digit, four-digit, six-digit, etc.

As further illustrated by FIG. 2D, codewords represented by the 10th, 11th, 17th, 19th, 23rd, 24th, and 29th positions in the per codeword bitmap 202 were also not received correctly by the receiver node and their respective indices 212 are included as entries 214B-214H in the list of bitmap indices of failed codewords 200D of FIG. 2D. All the entries 214A-214H are combined or concatenated together and sent to the sender node as HARQ feedback, e.g., in a feedback packet.

When the sender node receives the list of bitmap indices of failed codewords 200D, it retransmits to the receiver node the codewords identified by the entries 214A-214H and thus retransmits only those codewords that were not received correctly at the receiver node. The list of bitmap indices of failed codewords 200D of FIG. 2D is an example of lossless feedback since only those codewords that were not received correctly at the receiver node are retransmitted.

The list of bitmap indices of failed codewords 200D may be useful or beneficial when the number of codewords in error is sufficiently or relatively small. In the example of FIG. 2D, the list of bitmap indices of failed codewords 200D is longer than the per codeword bitmap 202 and would likely not be used in practice under such circumstances. In general, the list of bitmap indices of failed codewords 200D is unlikely to be used if the number of failed codewords multiplied by the length of each index entry is greater than the length of the per codeword bitmap 202. The list of bitmap indices of failed codeword 200D may be used if the number of failed codewords multiplied by the length of each index entry is less than the length of the per codeword bitmap 202.

The bitmap 200E of FIG. 2E has a format type of list of bitmap start indices of failed codewords with run length and may be referred to as a list of bitmap start indices of failed codewords with run length 200E. Due to space constraints, the list of bitmap start indices of failed codewords with run length 200E wraps around to a second line as illustrated. As in FIG. 2B, in FIG. 2E the receiver node may generate and/or store locally the per codeword bitmap 202. For illustration purposes, FIG. 2E includes the indices 212 of all positions or locations in the per codeword bitmap 202.

In the example of FIG. 2E, the receiver node populates the list of bitmap start indices of failed codewords with run length 200E with (1) the index of each position in the per codeword bitmap 202 where a run of one or more failed codewords begins, and (2) a follow on length, e.g., a number of failed codewords in the run that follow the first failed codeword of the run. For example, the first run begins at the sixth position in the per codeword bitmap 202 and does not have any failed codewords following the first failed codeword of the run. Thus, the list of bitmap start indices of failed codewords with run length 200E begins with the first entry 214A being the index of the sixth codeword, e.g., the index where the first run begins, followed by a follow on length 216A of zero. The entry 214A and the follow on length 216A are shown in FIG. 2E as, respectively, five-digit and three-digit binary numbers. Other entries and follow on lengths in the list of bitmap start indices of failed codewords with run length 200E may similarly be five-digit or three-digit binary numbers. In other implementations, each of the entries and follow on lengths in the list of bitmap start indices of failed codewords with run length 200E may have some other length, e.g., two-digit, three-digit, four-digit, five-digit, six-digit, etc.

As further illustrated by FIG. 2E, other runs of failed codewords begin at the 10th, 17th, 19th, 23rd, and 29th positions in the per codeword bitmap, each having a follow on length of, respectively, one, zero, zero, one, and zero. Accordingly, the list of bitmap start indices of failed codewords with run length 200E includes, for each of the runs, a corresponding one of the entries 214B, 214D, 214E, 214F, and 214H designating the start index of the corresponding run followed by a corresponding follow on length 216B-216F. All the entries 214A, 214B, 214D, 214E, 214F, 214H of start indices of the runs of failed codewords and corresponding follow on lengths 216A-216F (hereinafter collectively "follow on lengths 216" or generically "follow on length 216") are combined or concatenated together and sent to the sender node as HARQ feedback, e.g., in a feedback packet.

When the sender node receives the list of bitmap start indices of failed codewords with run length 200E, it retransmits to the receiver node the codewords identified by the entries 214A, 214B, 214D, 214E, 214F, 214H and corresponding follow on lengths 216 and thus retransmits only those codewords that were not received correctly at the receiver node. The list of bitmap start indices of failed codewords with run length 200E of FIG. 2E is an example of lossless feedback since only those codewords that were not received correctly at the receiver node are retransmitted.

In the example of FIG. 2E, the entry for each start index of each run is followed by the follow on length of the run. In other implementations, the entry for each start index of each run may be followed by a total run length of the run.

The list of bitmap start indices of failed codewords with run length 200E may be useful or beneficial when failed codewords occur in clusters. In the example of FIG. 2E, the list of bitmap start indices of failed codewords with run length 200E is longer than the per codeword bitmap 202 and would likely not be used in practice under such circumstances. The list of bitmap start indices of failed codewords may be used, e.g., when the failed codewords are sufficiently clustered that the length of the list of bitmap start indices of failed codewords with run length 200E is less than the length of the per codeword bitmap 202.

In some implementations, the bitmap sent by the receiver node to the sender node as HARQ feedback may include a probabilistic data structure. A probabilistic data structure is a form of lossy compression. It uses fewer bits than the number of codewords, e.g., fewer bits than the per codeword bitmap 200A, 202 of FIGS. 2A-2D. The index of each failed codeword may be represented in the probabilistic data structure by a pattern of bits. Suitable probabilistic data structures for HARQ feedback correctly identify for retransmission each failed codeword, e.g., they do not have false negatives. Suitable probabilistic data structures for HARQ feedback may have false positives, may identify for retransmission one or more codewords that were correctly received by the receiver node. Examples of suitable probabilistic data structures to use as HARQ feedback include Bloom filters and hash tables.

As an example, the probabilistic data structure may include a Bloom filter. The Bloom filter begins as a bit array of m bits initialized to zero. The receiver node may feed the index of a failed codeword to k hash functions to obtain k array positions and may then set the bits at the k array positions of the Bloom filter to one. The receiver node may repeat this process with the index of each failed codeword and may send the resulting Bloom filter to the sender node as HARQ feedback. The sender node may then query the Bloom filter for all indexes of the codewords sent to the receiver node. In particular, for a given index, the sender node may feed the index to the same k hash functions as the receiver node to obtain k array positions and may check the value at each of the k array positions in the Bloom filter. If the bit at any of the k array positions is set to zero, the codeword at the queried index was received correctly by the receiver node. If the bit at each of the k array positions is set to one, the codeword at the queried index was probably not received correctly by the receiver node and may be retransmitted by the sender node to the receiver node in the retransmission wireless data.

Returning to the FIGS., the bitmap 200F of FIG. 2F has a format type of compressed per codeword bitmap and may be referred to as a compressed per codeword bitmap 200F. As in FIG. 2B, in FIG. 2F the receiver node may generate and/or store locally the per codeword bitmap 202.

As indicated elsewhere herein, in regular operation it is expected that the vast majority of codewords will be received correctly such that the per codeword bitmap 202 will be sparsely populated by ones (or zeroes, or other symbol(s)) that identify the failed codewords. Since the per codeword bitmap 202 is assumed to be relatively sparse, implementations herein may identify the failed codewords with a number of bits that is less than the total number of codewords. If the probability of a bit with value 1 in the per codeword bitmap 202 is p, the average number of bits to represent the information for each codeword would be $-p \log_2(p)-(1-p)\log_2(1-p)$, which may be used to determine a suitable compression technique to generate a compressed per codeword bitmap such as the compressed per codeword bitmap 200F of FIG. 2F.

Some example compression techniques that may be implemented to generate compressed per codeword bitmaps as described herein include run-length encoding, Shannon-Fano coding, and dictionary-based compression. The compression may be either lossless or lossy. Lossy compression as used herein would mean that some codewords that were received correctly would be identified for retransmission.

The example of FIG. 2F uses run-length encoding. In particular, the receiver node may determine a run length 218A-218I of each run of zeroes 220A-220I and include it, e.g., as a three-digit binary number, in the compressed per codeword bitmap 200F. For example, the first run of zeroes 220A has a length of five which is included in the compressed per codeword bitmap 200F as run length 218A. The other runs of zeroes 220B-220I in the per codeword bitmap 202 have run lengths of, respectively, three, zero, five, one, three, zero, four, and three which are included in the compressed per codeword bitmap 200F as run lengths 218B-218I. The run lengths 218A-218I are shown in FIG. 2F as three-digit binary numbers. In other implementations, each of the run lengths 218A-218I may have some other length, e.g., two-digit, four-digit, five-digit, etc. All the run lengths 218A-218I are combined or concatenated together and sent to the sender node as HARQ feedback, e.g., in a feedback packet.

When the sender node receives the compressed per codeword bitmap 200F, it may decompress the compressed per codeword bitmap 200F to locally generate the per codeword bitmap 202. Using the locally generated per codeword bitmap 202, the sender node may then identify the failed codewords and retransmit them to the receiver node.

Figure 3:
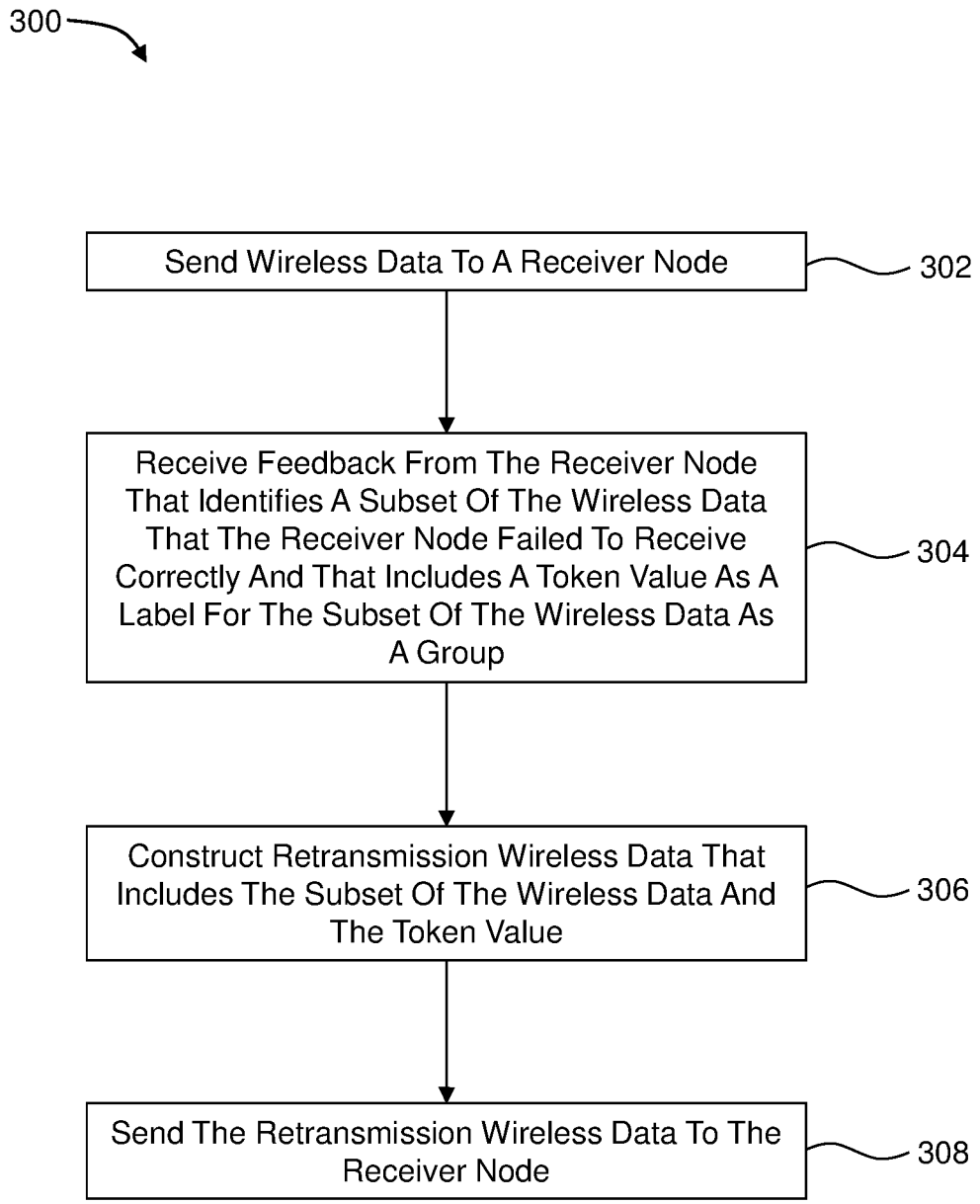
FIG. 3 illustrates a flowchart of an example method to perform HARQ from the point of view of a sender node.

FIG. 3 illustrates a flowchart of an example method 300 to perform HARQ from the point of view of a sender node. The method 300 may be performed by any suitable system, apparatus, or device. For example, one or more of the wireless nodes 102, 104 of FIG. 1 may perform or direct performance of one or more of the operations associated with the method 300. For purposes of discussion, the method 300 may be discussed as being performed by the sender node 102 of FIG. 1. The method 300 may include one or more of blocks 302, 304, 306, or 308. The method 300 may begin at block 302.

At block 302, the method 300 includes sending wireless data to a receiver node. The receiver node may be the receiver node 104B of FIG. 1. Block 302 may be followed by block 304.

At block 304, the method 300 includes receiving feedback from the receiver node that identifies a subset of the wireless data that the receiver node failed to receive correctly and that includes a token value as a label for the subset of the wireless data as a group. The wireless data may include a wireless data packet with multiple codewords. The subset of the wireless data that the receiver node failed to receive correctly may include a subset of the codewords. In some implementations, the token value includes at least a portion of a unique identifier of the receiver node. Block 304 may be followed by block 306.

At block 306, the method 300 includes constructing retransmission wireless data that includes the subset of the wireless data and the token value. Block 306 may be followed by block 308.

At block 308, the method 300 includes sending the retransmission wireless data to the receiver node.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed implementations.

The feedback received at block 304 may also identify a second subset of the wireless data that the receiver node failed to receive correctly and may also include a second token value as a label for the second subset of the wireless data. The method 300 may further include constructing second retransmission wireless data that includes the second subset of the wireless data and the second token value and sending the second retransmission wireless data to the receiver node.

The receiver node may be a first client device, such as a STA associated with an AP as described with respect to FIG. 1. The method 300 may include allocating, at the AP, a first set of token values to the first client device in a network served by the AP. The method 300 may include allocating, at the AP, a second set of token values to a second client device in the network, the second set of token values not overlapping with the first set of token values. The method 300 may include notifying the first client device of the first set of token values for retransmissions requested by the first client device and notifying the second client device of the second set of token values for retransmissions requested by the second client device. Thus, the AP may coordinate token values among the various client devices that associate with the AP to avoid multiple client devices inadvertently using the same token value to request retransmissions.

The method 300 may include sending second retransmission wireless data to a second receiver node. In some implementations, the retransmission wireless data and the second retransmission wireless data are sent to the receiver node and the second receiver node in a same signaling frame. In this and other implementations, the retransmission wireless data and the second retransmission wireless data may have orthogonal encoding. Alternatively, a retransmission signal field of the signaling frame may be separated into a first field for the receiver node and a second field for the second receiver node.

In some implementations, the feedback from the receiver node identifies a format type of the feedback from among multiple format types understandable by the sender node that sends the wireless data, receives the feedback, and constructs and sends the retransmission wireless data. In this and other implementations, the method 300 may further include interpreting the feedback at the sender node based on the identified format type to identify at the sender node the subset of the wireless data that the receiver node failed to receive correctly.

Figure 4:
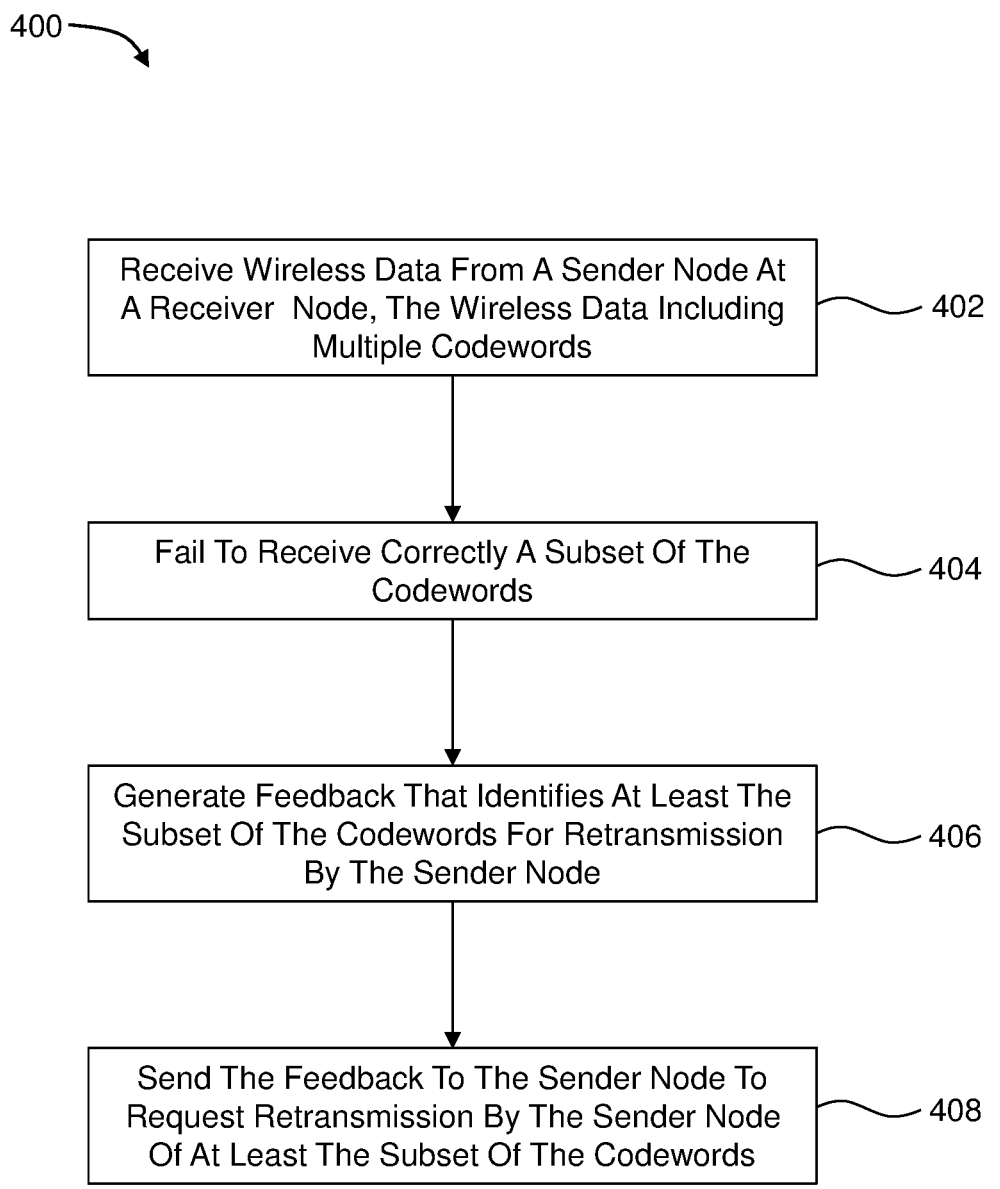
FIG. 4 illustrates a flowchart of an example method to perform HARQ from the point of view of a receiver node.

FIG. 4 illustrates a flowchart of an example method 400 to perform HARQ from the point of view of a receiver node. The method 400 may be performed by any suitable system, apparatus, or device. For example, one or more of the wireless nodes 102, 104 of FIG. 1 may perform or direct performance of one or more of the operations associated with the method 400. For purposes of discussion, the method 400 may be discussed as being performed by the receiver node 104A of FIG. 1. The method 400 may include one or more of blocks 402, 404, 406, or 408. The method 400 may begin at block 402.

At block 402, the method 400 includes receiving wireless data from a sender node at a receiver node, the wireless data including multiple codewords. The sender node and the receiver node may respectively include the sender node 102 and the receiver node 104A of FIG. 1. Block 402 may be followed by block 404.

At block 404, the method 400 may include failing to receive correctly a subset of the codewords. Block 404 may be followed by block 406.

At block 406, the method 400 may include generating feedback that identifies at least the subset of the codewords for retransmission by the sender node. The feedback may be lossy feedback in which it identifies both failed codewords and at least some codewords that were received correctly. Alternatively, the feedback may be lossless feedback in which it identifies only failed codewords without identifying any codewords that were received correctly. Block 406 may be followed by block 408.

At block 408, the method 400 may include sending the feedback to the sender node to request retransmission by the sender node of at least the subset of the plurality of codewords that were not received correctly.

In some implementations, the feedback enables or disables HARQ retransmission at the sender node. Alternatively or additionally, the feedback may have a format type selected from among multiple format types understandable by the sender node and the feedback may identify the format type. Alternatively or additionally, the feedback includes a token value as a label for the subset of codewords as a group. Alternatively or additionally, a transmission parameter of the receiver node to send the feedback to the sender node may be selected based on a channel quality indicator of a channel from the receiver node to the sender node.

Where the feedback enables or disables HARQ retransmission, the feedback may enable or disable HARQ retransmission at the sender node based on a quantity of the subset of the codewords. For example, the feedback may enable HARQ retransmission at the sender node if the quantity of the subset of the codewords is less than a threshold by requesting retransmission by the sender node of at least the subset of the codewords without requesting retransmission of all of the codewords. Alternatively, the feedback may disable HARQ retransmission at the sender node if the quantity of the subset of the codewords is greater than the threshold by requesting retransmission by the sender node of all of the codewords.

The method 400 may include identifying a pattern of the subset of the codewords that failed to receive correctly; and selecting the format type from among the multiple format types based on the pattern of the subset of the codewords that failed to receive correctly. For example, if the pattern of the subset of the codewords that failed to receive correctly indicates the codewords that failed to receive correctly are clustered, the receiver node may select a format type of grouped codeword bitmap, grouped codeword bitmap with failure patterns, list of bitmap start indices of failed codewords with run length, or compressed per codeword bitmap. As another example, if the pattern indicates that the total number of failed codewords is relatively small, the receiver node may select a format type of grouped codeword bitmap, grouped codeword bitmap with failure patterns, list of bitmap indices of failed codewords, or probabilistic data structure.

In some implementations, the method 400 may include receiving retransmission wireless data from the sender node. The retransmission wireless data may include the token value and retransmitted versions of the subset of the codewords that failed to receive correctly. The token value may identify the subset of the codewords as the group without per codeword identification.

Alternatively or additionally, the method 400 may include failing to receive correctly a second subset of the codewords. In this example, the feedback may further identify the second subset of the codewords for retransmission by the sender node and the feedback may further include a second token value as a label for the second subset of the codewords as a second group. Thus, the method 400 may include receiving retransmission wireless data from the sender node that includes the token value, the subset of the codewords (identified by the token value), the second token value, and the second subset of the codewords (identified by the second token value).

The feedback generated by the receiver node and sent to the sender node may include lossless feedback that identifies only codewords that failed to receive correctly for retransmission by the sender node. Alternatively, the feedback may include lossy feedback that identifies both all codewords that failed to receive correctly and some codewords that were received correctly for retransmission by the sender node.

The method 400 may include selecting the transmission parameter of the receiver node to send the feedback to the sender node based on the channel quality indicator of the channel from the receiver node to the sender node. The transmission parameter may include at least one of a MCS or a number of transmissions streams of the receiver node.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example or examples (e.g., example 2), or combined with aspects of another example. The following is a non-limiting summary of some example implementations presented herein.

A first example can include a method, including sending wireless data to a receiver node; receiving feedback from the receiver node that identifies a subset of the wireless data that the receiver node failed to receive correctly and that includes a token value as a label for the subset of the wireless data as a group; constructing retransmission wireless data that includes the subset of the wireless data and the token value; and sending the retransmission wireless data to the receiver node.

A second example can include a sender node for wireless communication with a receiver node in a wireless network, the sender node including: a memory; and a processor coupled to the memory, the processor to perform or control performance of operations including: sending wireless data to the receiver node; receiving feedback from the receiver node that identifies a subset of the wireless data that the receiver node failed to receive correctly and that includes a token value as a label for the subset of the wireless data as a group; constructing retransmission wireless data that includes the subset of the wireless data and the token value; and sending the retransmission wireless data to the receiver node.

A third example can include a method, including: receiving wireless data from a sender node at a receiver node, the wireless data including multiple codewords; failing to receive correctly a subset of the codewords; generating feedback that identifies at least the subset of the codewords for retransmission by the sender node; and sending the feedback to the sender node to request retransmission by the sender node of at least the subset of the codewords; where at least one of: the feedback enables or disables HARQ retransmission at the sender node; the feedback has a format type selected from among multiple format types understandable by the sender node and the feedback identifies the format type; the feedback includes a token value as a label for the subset of the codewords as a group; or a transmission parameter of the receiver node to send the feedback to the sender node is selected based on a channel quality indicator of a channel from the receiver node to the sender node.

A fourth example can include a receiver node for wireless communication with a sender node in a wireless network, the receiver node including: a memory; and a processor coupled to the memory, the processor to perform or control performance of operations including: receiving wireless data from the sender node, the wireless data including multiple codewords; failing to receive correctly a subset of the codewords; generating feedback that identifies at least the subset of the codewords for retransmission by the sender node; and sending the feedback to the sender node to request retransmission by the sender node of at least the subset of the codewords; where at least one of: the feedback enables or disables HARQ retransmission at the sender node; the feedback has a format type selected from among multiple format types understandable by the sender node and the feedback identifies the format type; the feedback includes a token value as a label for the subset of the codewords as a group; or a transmission parameter of the receiver node to send the feedback to the sender node is selected based on a channel quality indicator of a channel from the receiver node to the sender node.

Figure 5:
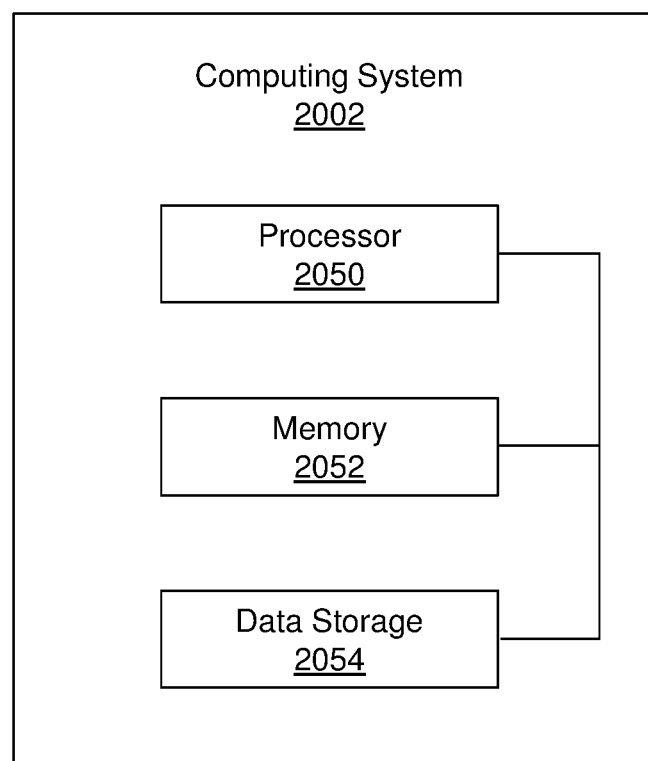
FIG. 5 illustrates a block diagram of an example computing system that may be used to perform or direct performance of one or more operations described according to at least one implementation of the present disclosure.

FIG. 5 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSPs, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2 N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    sending wireless data to a receiver node;
    receiving feedback from the receiver node that identifies a subset of the wireless data that the receiver node failed to receive correctly and that includes a token value as a label for the subset of the wireless data as a group;
    constructing retransmission wireless data that includes the subset of the wireless data and the token value; and
    sending the retransmission wireless data to the receiver node;
    wherein the receiver node is a first client device, the method further comprising:
        allocating, at an access point (AP), a first set of token values to the first client device in a network served by the AP;
        allocating, at the AP, a second set of token values to a second client device in the network, the second set of token values not overlapping with the first set of token values;
        notifying the first client device of the first set of token values for retransmissions requested by the first client device; and
        notifying the second client device of the second set of token values for retransmissions requested by the second client device.

2. The method of claim 1, wherein the wireless data comprises a wireless packet that includes a plurality of codewords and the subset of the wireless data comprises a subset of the plurality of codewords.

3. The method of claim 1, wherein the feedback further identifies a second subset of the wireless data that the receiver node failed to receive correctly and further includes a second token value as a label for the second subset of the wireless data and the method further includes:
    constructing second retransmission wireless data that includes the second subset of the wireless data and the second token value; and
    sending the second retransmission wireless data to the receiver node.

4. The method of claim 1, wherein the feedback from the receiver node identifies a format type of the feedback from among multiple format types understandable by a sender node that sends the wireless data, receives the feedback, and constructs and sends the retransmission wireless data, the method further comprising interpreting the feedback at the sender node based on the identified format type to identify at the sender node the subset of the wireless data that the receiver node failed to receive correctly.

5. The method of claim 4, wherein the multiple format types include at least two format types selected from the following:
    a grouped codeword bitmap;
    a grouped codeword bitmap with failure patterns;
    a list of bitmap indices of failed codewords;
    a list of bitmap start indices of failed codewords with run length;
    a probabilistic data structure; and
    a compressed per codeword bitmap.

6. A method, comprising:
    sending wireless data to a receiver node;
    receiving feedback from the receiver node that identifies a subset of the wireless data that the receiver node failed to receive correctly and that includes a token value as a label for the subset of the wireless data as a group, wherein the token value includes at least a portion of a unique identifier of the receiver node;
    constructing retransmission wireless data that includes the subset of the wireless data and the token value; and
    sending the retransmission wireless data to the receiver node.

7. The method of claim 6, wherein the wireless data comprises a wireless packet that includes a plurality of codewords and the subset of the wireless data comprises a subset of the plurality of codewords.

8. The method of claim 6, wherein the feedback further identifies a second subset of the wireless data that the receiver node failed to receive correctly and further includes a second token value as a label for the second subset of the wireless data and the method further includes:
    constructing second retransmission wireless data that includes the second subset of the wireless data and the second token value; and
    sending the second retransmission wireless data to the receiver node.

9. The method of claim 6, wherein the feedback from the receiver node identifies a format type of the feedback from among multiple format types understandable by a sender node that sends the wireless data, receives the feedback, and constructs and sends the retransmission wireless data, the method further comprising interpreting the feedback at the sender node based on the identified format type to identify at the sender node the subset of the wireless data that the receiver node failed to receive correctly.

10. The method of claim 9, wherein the multiple format types include at least two format types selected from the following:
    a grouped codeword bitmap;
    a grouped codeword bitmap with failure patterns;
    a list of bitmap indices of failed codewords;
    a list of bitmap start indices of failed codewords with run length;

a probabilistic data structure; and
a compressed per codeword bitmap.

11. A method, comprising:
sending wireless data to a receiver node;
receiving feedback from the receiver node that identifies a subset of the wireless data that the receiver node failed to receive correctly and that includes a token value as a label for the subset of the wireless data as a group;
constructing retransmission wireless data that includes the subset of the wireless data and the token value;
sending the retransmission wireless data to the receiver node; and
sending second retransmission wireless data to a second receiver node,
wherein:
the retransmission wireless data and the second retransmission wireless data are sent to the receiver node and the second receiver node in a same signaling frame; and
one of:
the retransmission wireless data and the second retransmission wireless data have orthogonal encoding; or
a retransmission signal field of the signaling frame is separated into a first field for the receiver node and a second field for the second receiver node.

12. The method of claim 11, wherein the wireless data comprises a wireless packet that includes a plurality of codewords and the subset of the wireless data comprises a subset of the plurality of codewords.

13. The method of claim 11, wherein the feedback further identifies a second subset of the wireless data that the receiver node failed to receive correctly and further includes a second token value as a label for the second subset of the wireless data and the method further includes constructing the second retransmission wireless data that includes the second subset of the wireless data and the second token value.

14. The method of claim 11, wherein the feedback from the receiver node identifies a format type of the feedback from among multiple format types understandable by a sender node that sends the wireless data, receives the feedback, and constructs and sends the retransmission wireless data, the method further comprising interpreting the feedback at the sender node based on the identified format type to identify at the sender node the subset of the wireless data that the receiver node failed to receive correctly.

15. The method of claim 14, wherein the multiple format types include at least two format types selected from the following:
a grouped codeword bitmap;
a grouped codeword bitmap with failure patterns;
a list of bitmap indices of failed codewords;
a list of bitmap start indices of failed codewords with run length;
a probabilistic data structure; and
a compressed per codeword bitmap.

16. A method, comprising:
receiving wireless data from a sender node at a receiver node, the wireless data including a plurality of codewords;
failing to receive correctly a subset of the plurality of codewords;
generating feedback that identifies at least the subset of the plurality of codewords for retransmission by the sender node; and
sending the feedback to the sender node to request retransmission by the sender node of at least the subset of the plurality of codewords;
wherein at least one of:
the feedback enables or disables Hybrid Automatic Repeat Request (HARQ) retransmission at the sender node;
the feedback has a format type selected from among multiple format types understandable by the sender node and the feedback identifies the format type;
the feedback includes a token value as a label for the subset of the plurality of codewords as a group; or
a transmission parameter of the receiver node to send the feedback to the sender node is selected based on a channel quality indicator of a channel from the receiver node to the sender node;
and wherein:
the feedback enables or disables HARQ retransmission at the sender node based on a quantity of the subset of the plurality of codewords;
the feedback enables HARQ retransmission at the sender node if the quantity of the subset of the plurality of codewords is less than a threshold by requesting retransmission by the sender node of at least the subset of the plurality of codewords without requesting retransmission of all of the plurality of codewords; and
the feedback disables HARQ retransmission at the sender node if the quantity of the subset of the plurality of codewords is greater than the threshold by requesting retransmission by the sender node of all of the plurality of codewords.

17. The method of claim 16, further comprising:
identifying a pattern of the subset of the plurality of codewords that failed to receive correctly; and
selecting the format type from among the multiple format types based on the pattern of the subset of the plurality of codewords that failed to receive correctly.

18. The method of claim 16, further comprising:
failing to receive correctly a second subset of the plurality of codewords, wherein the feedback further identifies the second subset of the plurality of codewords for retransmission by the sender node and the feedback further includes a second token value as a label for the second subset of the plurality of codewords as a second group; and
receiving retransmission wireless data from the sender node that includes the token value, the subset of the plurality of codewords, the second token value, and the second subset of the plurality of codewords.

19. The method of claim 16, wherein the feedback includes one of:
lossless feedback that identifies only codewords of the plurality of codewords that failed to receive correctly for retransmission by the sender node; or
lossy feedback that identifies both all codewords of the plurality of codewords that failed to receive correctly and some codewords of the plurality of codewords that were received correctly for retransmission by the sender node.

20. The method of claim 16, wherein the multiple format types include at least two format types selected from the following:
a grouped codeword bitmap;
a grouped codeword bitmap with failure patterns;
a list of bitmap indices of failed codewords;
a list of bitmap start indices of failed codewords with run length;

a probabilistic data structure; and a compressed per codeword bitmap.

21. The method of claim 16, wherein:

a quantity of the plurality of codewords is N;

the feedback identifies, using not more than M bits, the subset of the plurality of codewords that failed to receive correctly; and

M<N.

22. The method of claim 16, further comprising selecting the transmission parameter of the receiver node to send the feedback to the sender node based on the channel quality indicator of the channel from the receiver node to the sender node, wherein the transmission parameter includes at least one of a modulation and coding scheme (MCS) or a number of transmissions streams of the receiver node.

\* \* \* \* \*